June 3, 1930.                C. B. SCOTT                1,761,238
                          EYE TESTING DEVICE
                         Filed June 13, 1927        2 Sheets-Sheet 1
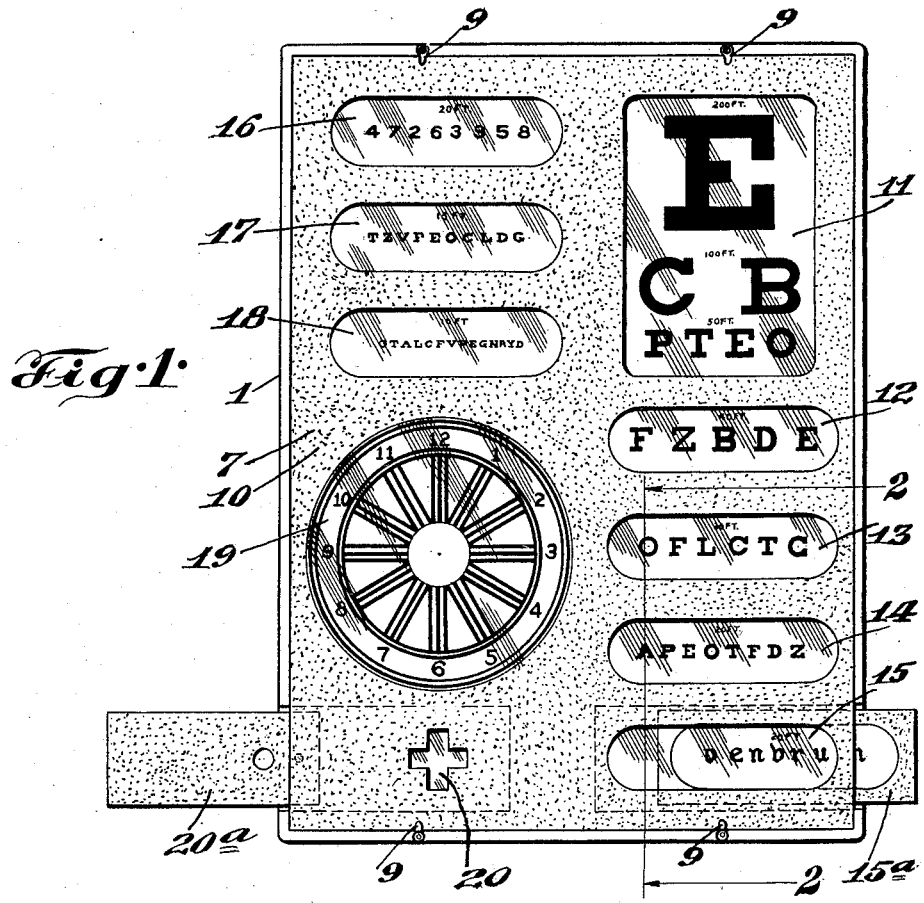
INVENTOR
Charlie B. Scott,
By
ATTORNEY June 3, 1930.  C. B. SCOTT  1,761,238
EYE TESTING DEVICE
Filed June 13, 1927  2 Sheets-Sheet 2
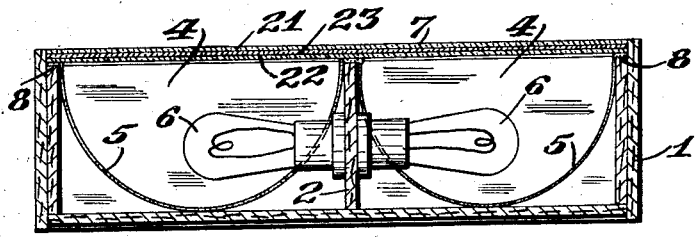
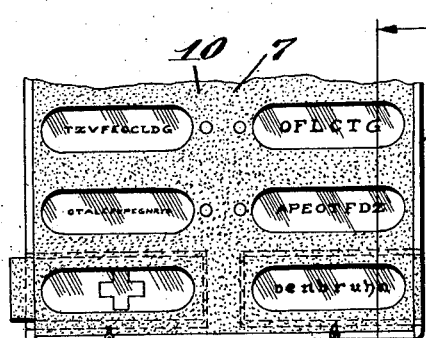
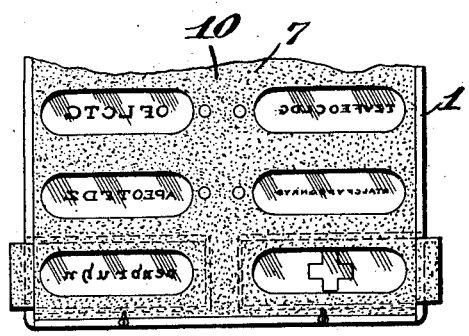
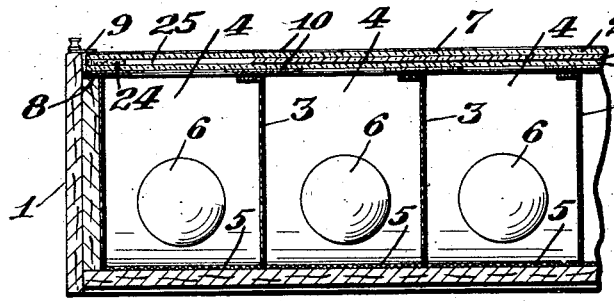
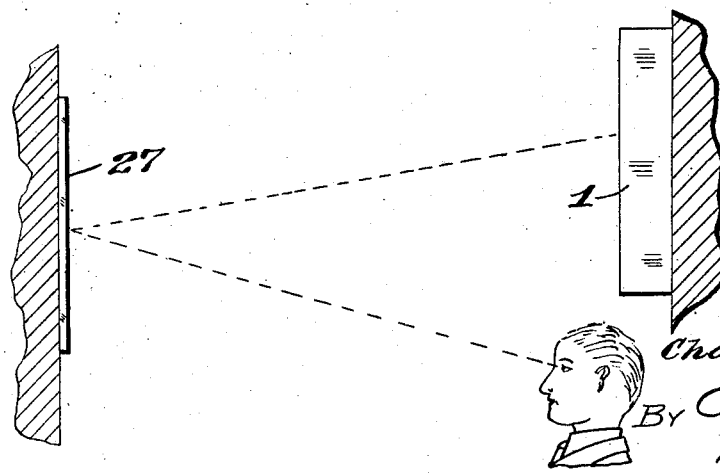
INVENTOR
Charlie B. Scott,
By
ATTORNEY Patented June 3, 1930

1,761,238

UNITED STATES PATENT OFFICE

CHARLIE B. SCOTT, OF ST. LOUIS, MISSOURI, ASSIGNOR TO M. E. GREEN MANUFACTURING CO., OF ST. LOUIS, MISSOURI, A CORPORATION OF MISSOURI

EYE-TESTING DEVICE

Application filed June 13, 1927. Serial No. 198,560.

This invention relates generally to eye-testing devices of the type wherein the test-objects and characters thereof are illuminated in use. More particularly, my invention has to do with eye-testing devices comprising a cabinet having a series of separate compartments, each containing an illuminating element, usually an incandescent electric lamp-bulb, and being, respectively, covered in use by translucent panels that are visible through sight-openings provided therefor in the front wall of the cabinet, the panels having printed or otherwise marked thereon the several different objects, symbols, or characters employed in diagnosing the condition of the eyes, but all this without being limited exactly thereto.

My invention has for its principal objects to improve the structure of the front panel of the cabinet so as to simplify the same, to provide for its ready application to and removal from the cabinet and its interchangeability and reversibility in use, to facilitate the mounting thereon of the sheet of material on which are marked the respective test charts, symbols, or characters, and to display the latter in a clear and well defined manner.

And with the above and other objects in view, my invention resides in the novel features of form, construction, arrangement and combination of parts hereinafter described and pointed out in the claims.

In the accompanying drawings,

Figure 1 is a front face view of a cabinet illustrating and embodying an adaptation of my invention;

Figure 2 is a fragmentary vertical sectional view on the line 2—2, Figure 1;

Figure 3 is a horizontal cross sectional view through the cabinet;

Figure 4 is a front face view of the lower portion of a cabinet, showing a modification of the removable front plate thereof;

Figure 5 is a similar view, but showing the removable front plate reversed thereon;

Figure 6 is a sectional view on the line 6—6, Figure 4; and

Figure 7 is a schematic view illustrating the manner of reading the test objects or characters through the intermediary of a reflecting mirror when the front panel of the cabinet is reversed thereon as shown in Figure 5.

Referring more in detail and by reference characters to the drawings, 1 designates a suitable cabinet which is divided by a central longitudinal partition 2 to comprise two parallel chambers that are, in turn, subdivided by transverse partitions 3 affording a multiplicity of separate compartments 4. As shown, the side, end, and rear walls of the cabinet may be made of wood or any other suitable material, as is also the central partition 2. The transverse partitions 3, however, are preferably made of sheet asbestos, fibre-board, or the like, and between said partitions 3 are placed curved sheets 5 of similar material, which latter serve as reflectors for incandescent electric lamp bulbs 6, one of which is placed in each compartment 4. Preferably, the exposed faces of the partitions 3 and reflectors 5 are tinted in a shade of blue in order to give the desired hue to the light reflected thereby from the lamps 6 to ideally illumine the panels that cover the respective compartments and carry the test objects or characters to be presently described.

The front wall or panel 7 of the cabinet is a unitary slab-like structure that is preferably removably set in between the side and end walls of the cabinet, said front wall or panel resting at its margins upon the rabbeted or shouldered portions 8 of the cabinet side and end walls and at its middle upon the edge of the central partition 2, it being detachably held in place by movable securing clips 9.

This front wall or panel 7 is preferably composed of a body of clear sheet glass covered by a sheet of opaque fabric 10, which latter has openings therein co-ordinated with and corresponding to the sizes of the respective compartments of the cabinet and the relative areas of the fields on which the several test charts, objects, or other such characters are displayed.

It may be here stated that the several test charts, objects, or other such characters are printed or otherwise marked on a sheet of translucent material, preferably parchment paper, said sheet being of such proportions as to correspond with the major portion of the wall or panel 7 and include all except one or two of the sight openings above described, preferably the openings for the two lowermost compartments, with which latter special slides are made to co-operate, as will presently appear.

In the arrangement shown in Figure 1, there are ten of the compartments 4, and, of course, a corresponding number of sight openings, there being five in each of two tiers. The field of opening 11 of the uppermost of the compartments in the right hand tier is rectangular and relatively large, while the field of openings 12, 13, 14, and 15, below it are considerably smaller and oblong with their longitudinal axes in horizontal planes. The three upper openings 16, 17, and 18 of the tier to the left are similar in shape and size to openings 12 to 15, inclusive, while the next lower opening 19 is preferably circular and of considerable size. The lowermost opening 20 in this tier is substantially of the shape of a Greek cross. Through the openings 11 to 18, inclusive, there may be displayed test-characters or symbols of various kinds and sizes, while through the opening 19 may be displayed, as a special test character, an astigmatic dial or the like, and the cross-shaped opening 20 may be utilized for the application of slides thereto in various colors for the usual color tests, or opaque slides may be applied thereto having apertures of different sizes for use as muscle test light openings.

The slide for the opening 15 is designated as 15ᵃ in Figure 1, and the slide for the opening 20 as 20ᵃ.

One of the novel features of the present invention resides in the provision in the front wall or panel structure of the slideways for the said slides 15ᵃ and 20ᵃ. To this end, the wall or panel 7 is constructed of the two outer plates of clear glass or equivalent transparent material 21 and 22, each of the full length and cross dimensions of the wall or panel, with an interposed plate 23 of the same material and of the same width, but shorter in length than the said outer plates, there being provided a narrow filler strip 24 between the spaced end portions of said outer sheets, thus producing the slideway 25 (see Figure 2 of the drawings).

The panel structure as above described is preferably held together as a unit by cementing the outer opaque covering 10 to the outer face of the outer plate 21 and folding its side and end marginal portions over and cementing the same upon the rear face of the inner plate 22, it being understood, of course, that the sheet of parchment paper or the like on which the test characters or symbols are marked and as indicated by the heavy line at 26 in Figure 2, is first placed smoothly between one of the outer plates 21 or 22 and the interposed filler plate 23, where it is securely clamped.

In accordance with the foregoing described structure, it is obvious that removable and interchangeable pannels of different arrangements may be provided for a single cabinet, thus making for an economical, yet practical outfit for the purposes intended.

By covering both the outer and inner faces of the front wall or panel with the opaque material 10, except, of course, where the sight openings occur, as shown in Figures 4, 5, and 6 of the drawings, the wall or panel may be reversible. This is an advantage where the testing cabinet is necessarily used in limited quarters where the distance between it and the patient's position is relatively short, in which case the reading of the characters is accomplished through the intermediary of a reflecting mirror 27, as shown in Figure 7. In such instances, of course, the characters must be displayed from the cabinet in reverse order (see Figure 5), which may be conveniently effected by merely reversing the front wall or panel. Obviously, however, for this purpose the relative arrangement and sizes of the respective compartments and their openings must correspond in each parallel tier in cases of the double structure shown for illustration in the drawings.

While the cabinet shown in the drawings comprises a double tier of compartments and openings, the invention is not to be thereby limited, as the cabinet may include a greater number of separate tiers or only a single tier, and the structure also admits of considerable other modification within its spirit and scope as defined by the appended claims.

Having thus described my invention, what I claim and desire to secure by Letters Patent is:

1. In an eye-testing device, a unitary display-panel comprising a pair of transparent outer body-plates of the same shape and size disposed in flatwise relation, an intermediate plate of like character interposed between said outer body-plates, said intermediate plate being shorter than said outer plates in one cross direction but being otherwise of the same shape and size and registering marginally therewith, a filler-strip interposed between said outer body-plates and paralleling the shortened end portion of said intermediate plate in spaced relation thereto, thereby providing an open-end slideway between said outer body plates, a sheet of light-penetrable material interposed between one of said outer body plates and said intermediate plate and bearing thereon suitable test characters, and a sheet of opaque material covering the face of said panel and being folded over and secured upon the marginal portions of said outer body and intermediate plates, said covering sheet having sight openings therein coincident with the fields of display of the respective test characters of the first sheet.

2. In an eye-testing device, a cabinet having a series of separate illuminable compartments respectively opening through the front of the cabinet, and a reversible unitary panel for said cabinet covering the several compartments thereof, said panel comprising separate rigid transparent glass body-plates disposed flatwise together in registering relation, an interposed sheet of light-penetrable material bearing suitable test characters respectively correlated with the several compartments of the cabinet, and a sheet of opaque fabric covering the opposite faces of said panel and having sight openings therein coincident with the fields of display of the respective test characters of the first sheet, said test characters being displayed in regular order on one side of said panel and reversely on the other side thereof.

3. In an eye-testing-device, a display-panel comprising as a unitary structure a pair of rigid transparent glass body-plates secured flatwise together in superposed registering relation, a section of flexible light-penetrable material disposed flatwise intermediate the body-plates, said section bearing thereon a suitable test-character, and a section of flexible opaque fabric permanently disposed flatwise over and covering an exterior face of the panel, said fabric section having an uncovered sight-opening therethrough for visually exposing the test character of the first section.

4. In an eye testing-device, a display-panel comprising as a unitary structure a pair of separate rigid transparent glass body-plates arranged in superposed registering relation, a sheet of flexible light-penetrable material disposed flatwise intermediate the adjoining opposed faces of the body-plates, said sheet bearing thereon a suitable test-character, and a sheet of flexible opaque fabric permanently disposed flatwise over and covering an exterior face of one of the body-plates of the panel, said fabric sheet being marginally extended and folded over and attached to the exterior face of the other body-plate for securing the plates permanently together, said opaque sheet having an uncovered sight-opening therethrough for visually exposing the test-character of the first sheet.

5. In an eye testing device, a unitary display-panel comprising a pair of separate rigid transparent glass body-plates arranged in superposed registering relation, a sheet of flexible light-penetrable material disposed flatwise intermediate the adjoining opposed faces of the body-plates, said sheet bearing thereon a suitable test character, and a sheet of flexible opaque fabric cemented flatwise upon and covering an exterior face of one of the body-plates of the panel, said fabric sheet being marginally extended and folded over and cemented about the margins of the body-plates and thereby binding and securing the body-plates permanently together, said fabric sheet having an uncovered sight opening therethrough for visually exposing the test-character of the first sheet.

6. In an eye testing-device, a reversible display-panel comprising as a unitary structure a pair of rigid transparent body-plates arranged in superposed registering relation, a sheet of flexible light-penetrable material disposed flatwise intermediate the transparent body-members, said sheet bearing thereon a suitable test-character, and sheets of flexible opaque material permanently disposed flatwise over and covering the exterior faces of the panel, said opaque sheets having corresponding sight openings therethrough for visually exposing on both sides of the panel the test character of the first sheet.

7. In an eye testing-device, a display-panel comprising as a unitary structure a pair of rigid transparent body-plates arranged in superposed registering relation, a section of flexible light-penetrable material disposed flatwise intermediate the transparent body-members, said section bearing thereon suitable test-characters, and a section of opaque material cemented flatwise upon and covering an outer face of the panel, said opaque section having sight-openings therethrough for visually exposing the test-characters of the first section.

8. In an eye testing-device, a reversible display-panel comprising as a unitary structure a pair of separate rigid transparent body-plates arranged in superposed registering relation, a sheet of flexible light penetrable material disposed flatwise intermediate the adjoining faces of the body plates, said sheet bearing thereon suitable test-characters, and sheets of flexible opaque material cemented flatwise over and covering the opposed outer faces of the plates of the panel, said opaque sheets having registering sight-openings therethrough for visually exposing the test-characters of the first sheet.

9. In an eye testing cabinet, a display-panel comprising, as a unitary structure, a pair of separate outer transparent glass body-plates disposed in flatwise superposed registering relation, a third transparent glass slide-providing plate disposed flatwise intermediate the body-plates, a translucent sheet flatwise interposed between the third plate and one of the body plates, said sheet bearing test-characters, and a sheet of opaque fabric permanently disposed over the exterior face of one of the body plates, said fabric having its marginal portions folded over and adhesively fixed to the marginal portions of the body plates, said fabric having sight openings correlated to the test-characters of said intermediate sheet.

10. In an eye testing cabinet, a display-panel comprising, as a unitary structure, a pair of separate transparent rigid glass body plates disposed in flatwise superposed registering relation, a third transparent rigid glass slide-providing plate disposed flatwise intermediate the body plates, a translucent sheet flatwise interposed between said third plate and one of the body plates, said sheet bearing test-characters, and opaque fabric permanently disposed over and covering the outer faces of and marginally engaging both body plates, said fabric having upon both sides of the panel sight openings correlated to the test-characters of said intermediate sheet.

In testimony whereof, I have signed my name to this specification.

CHARLIE B. SCOTT.